United States Patent [19]

Ichikawa et al.

[11] Patent Number: 4,717,874
[45] Date of Patent: Jan. 5, 1988

[54] RELUCTANCE TYPE LINEAR POSITION DETECTION DEVICE

[75] Inventors: Wataru Ichikawa; Yuji Matsuki, both of Tokyo, Japan

[73] Assignee: Kabushiki Kaisha SG, Tokyo, Japan

[21] Appl. No.: 698,078

[22] Filed: Feb. 4, 1985

[30] Foreign Application Priority Data

| Feb. 10, 1984 [JP] | Japan | 59-21902 |
| Feb. 16, 1984 [JP] | Japan | 59-26141 |
| Dec. 7, 1984 [JP] | Japan | 59-257639 |

[51] Int. Cl.⁴ ............... G08C 19/06; G01B 7/14
[52] U.S. Cl. .................. 324/208; 340/870.32; 340/870.36
[58] Field of Search ............ 324/173, 174, 207, 208; 340/870.31, 870.32, 870.35, 870.36; 336/130

[56] References Cited

U.S. PATENT DOCUMENTS

| 3,243,692 | 3/1966 | Heissmeier | 324/208 X |
| 3,281,825 | 10/1966 | Corl et al. | 324/208 X |
| 3,908,781 | 9/1975 | Oishi et al. | 324/174 X |
| 3,956,973 | 5/1976 | Pomplas | 92/5 R |
| 4,170,754 | 10/1979 | Schmitz | 324/208 |
| 4,405,896 | 9/1983 | Akita | 324/208 |
| 4,406,999 | 9/1983 | Ward | 324/208 X |
| 4,471,304 | 9/1984 | Wolf | 324/208 |
| 4,556,886 | 12/1985 | Shimizu et al. | 324/208 X |
| 4,612,502 | 9/1986 | Spies | 324/208 |
| 4,612,503 | 9/1986 | Shimizu et al. | 324/208 |

FOREIGN PATENT DOCUMENTS

| 0115008 | 12/1982 | European Pat. Off. | 15/20 |
| 3347052 | 7/1985 | Fed. Rep. of Germany | 324/207 |
| 1210 | 1/1982 | Japan . | |
| 135917 | 8/1982 | Japan . | |
| 136718 | 9/1983 | Japan . | |

Primary Examiner—Gerard R. Strecker
Attorney, Agent, or Firm—Spensley, Horn, Jubas & Lubitz

[57] ABSTRACT

This detection device comprises a coil section and a rod section which is capable of linear displacement relative to the coil section. The rod section has a magnetic substance portion changing reluctance of a magnetic circuit passing through the coil section in accordance with the linear displacement and a conductive substance portion provided in part of the rod section where the reluctance is caused to increase relatively in such a manner that an eddy current path will be formed relative to flux. By this arrangement, in places where reluctance increases due to absence of the magnetic substance, reluctance is caused to further increase by the eddy current loss produced by presence of the conductive substance portion whereby the secondary side induced voltage level is further attenuated and the accuracy of detection can be improved. The rod section may be so constructed as to produce only the reluctance change due to the conductive substance portion. This detection device is applicable to detection of a piston rod position of a fluid powered cylinder.

26 Claims, 48 Drawing Figures

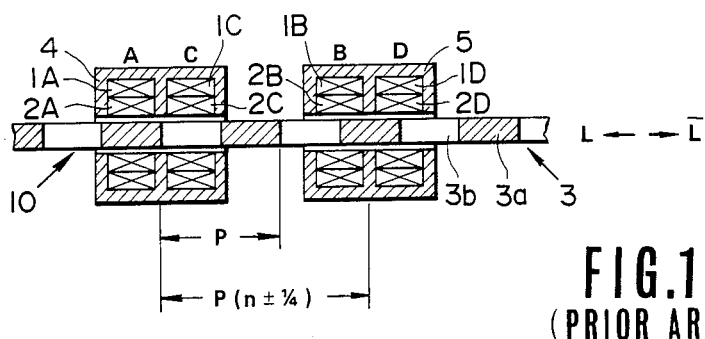
FIG. 1
(PRIOR ART)
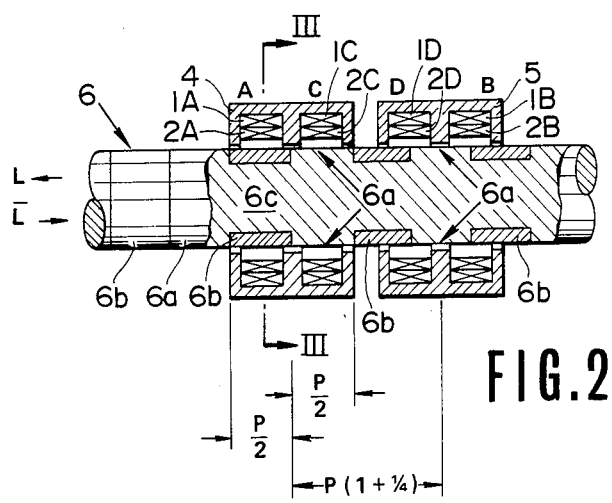 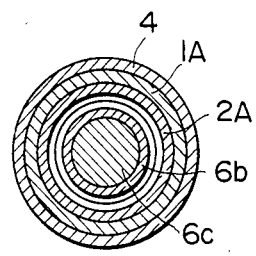
FIG. 2  FIG. 3
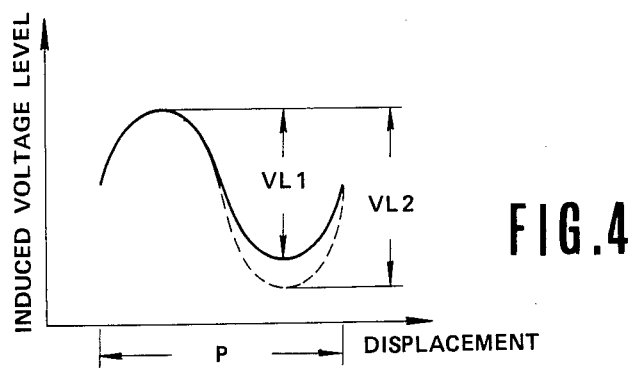
FIG. 4

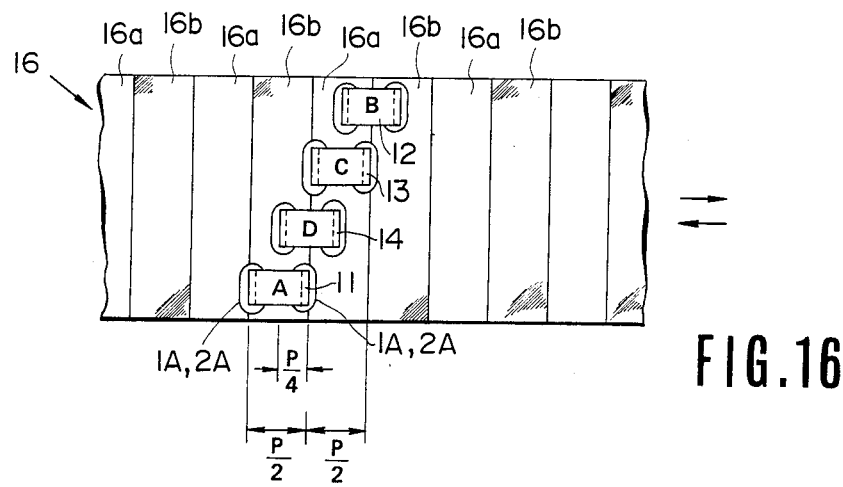
FIG.16
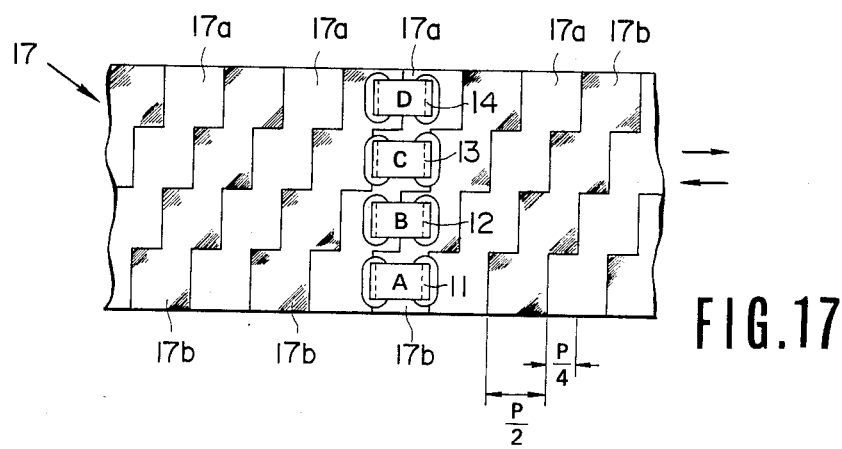
FIG.17
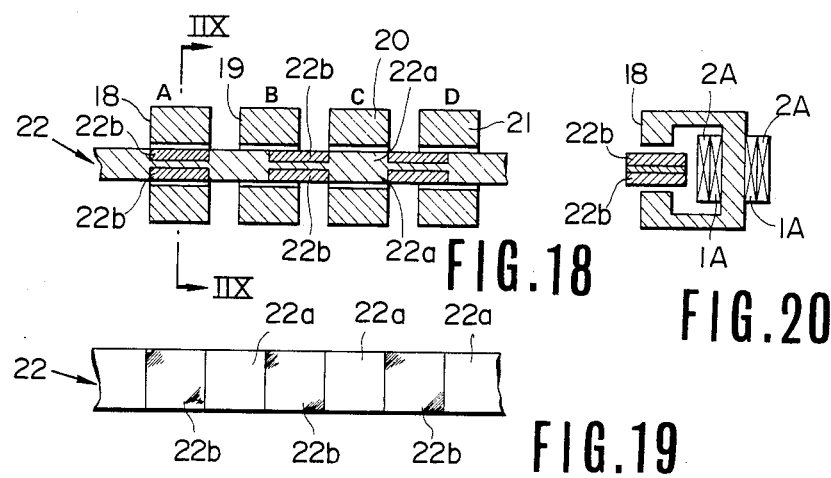
FIG.18
FIG.20
FIG.19

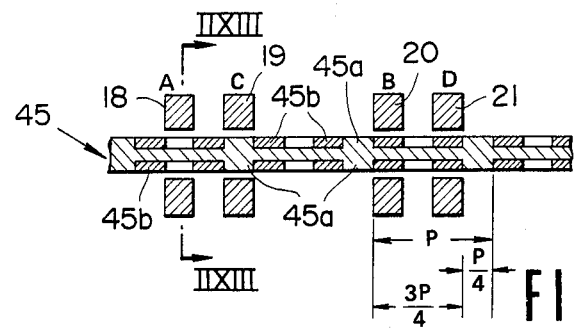
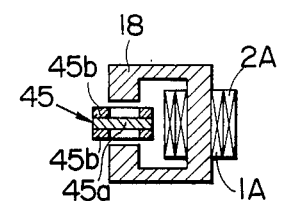
FIG.21    FIG.23
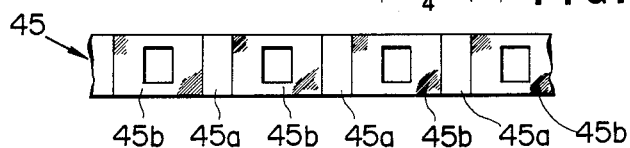
FIG.22
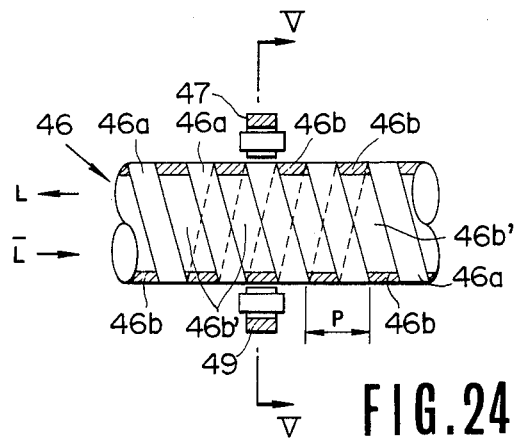
FIG.24
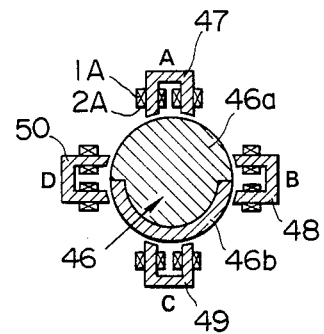
FIG.25

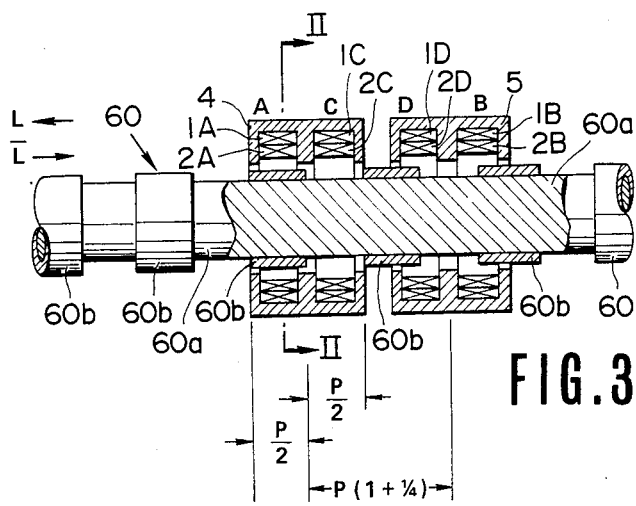
FIG.33
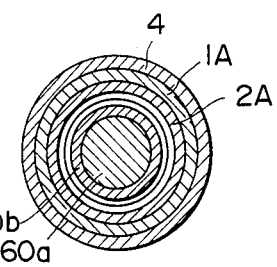
FIG.34
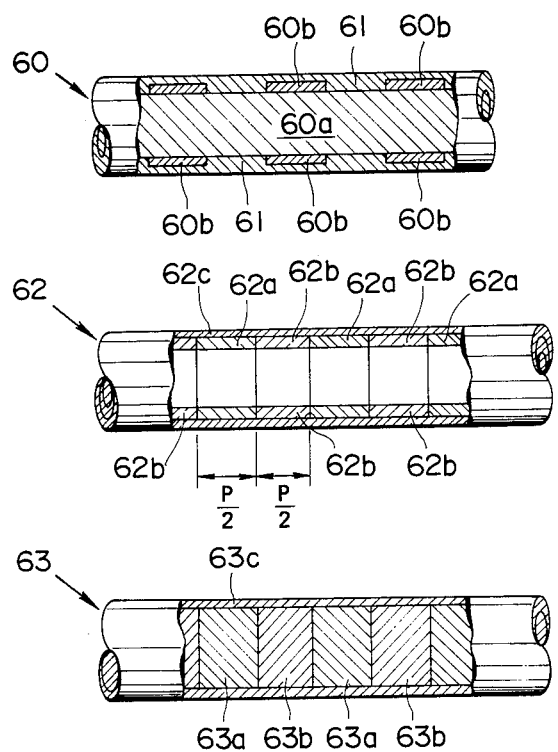
FIG.35
FIG.36
FIG.37
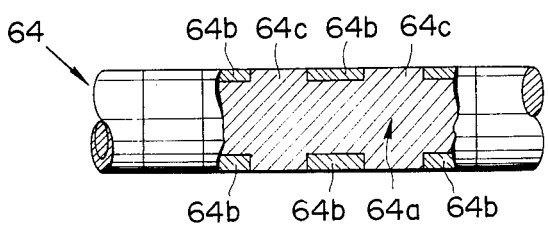
FIG.38

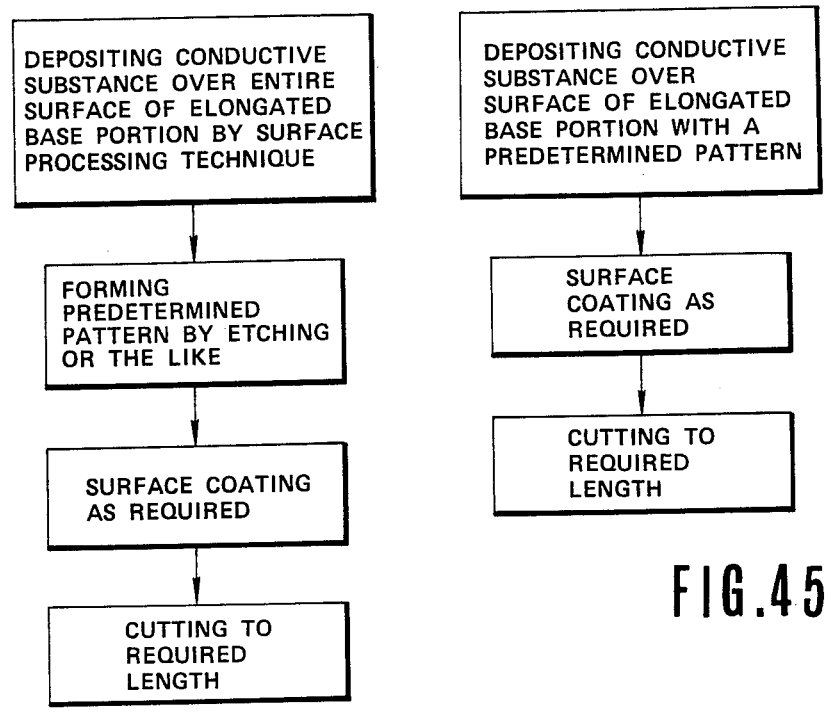
FIG.44
FIG.45
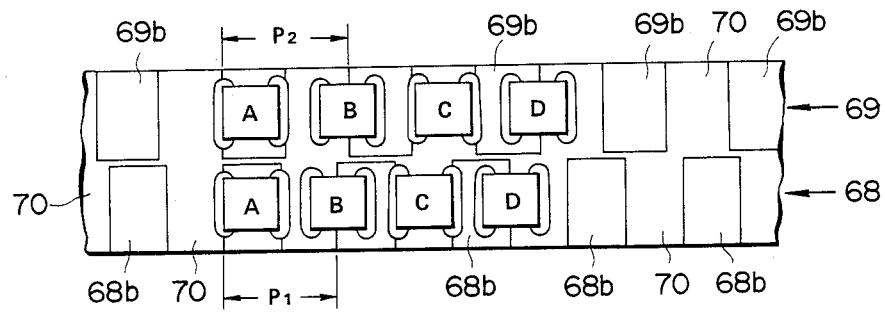
FIG.46

RELUCTANCE TYPE LINEAR POSITION DETECTION DEVICE

BACKGROUND OF THE INVENTION

This invention relates to a linear position detection device and, more particularly, to an induction type detection device capable of changing coefficient of induction in response to relative displacement of a core with respect to a coil thereby to obtain an output signal corresponding thereto and, more particularly, to a linear position detection device capable of producing an enhanced change in the coefficient of induction by using both reluctance change (permeance change) and eddy current loss as parameters thereby realizing a high-precision detection.

The invention relates also to a linear position detection device capable of obtaining a change in the coefficient of induction using at least the eddy current loss as a parameter. The invention relates also to a position detection device for a piston rod of a fluid powered cylinder and, more particularly, to an induction type piston rod position detection device capable of changing the coefficient of induction in response to relative displacement of a piston rod with respect to a winding fixed to the cylinder main body thereby to produce an output signal corresponding thereto and, more particularly, to a piston rod position detection device provided with a relatively conductive substance portion such as copper about the piston rod and being capable of producing an induction coefficient change using at least the eddy current loss as a parameter by the action of this conductive substance portion.

Known in the art of a linear position detection device of a variable reluctance type is a differential transformer. There are also disclosed detection devices of a phase shift system employing a variable reluctance type detector, for example, in Japanese Preliminary Utility Model Publication No. 135917/1982 or No. 136718/1983 or the U.S. patent application Ser. No. 06/348,674 (now U.S. Pat. No. 4,556,886) or West Germany Patent Application No. P3205032.1. Such prior art detection device are all constructed in such a manner that the coefficient of induction of the coil is caused to change only in response to reluctance change due to displacement of a magnetic member with a resulting limitation posed on the accuracy of detection. Particularly, the accuracy of detection for a minute displacement is limited due to the mechanical structure of these devices.

This will be explained in more detail with reference to FIG. 1. A prior art variable reluctance type linear position detector 10 comprises primary coils 1A–1D and secondary coils 2A–2D relatively fixed at predetermined locations and a core section 3 which is inserted in the coil space in such a manner that it is capable of a relative linear displacement. The core section 3 consists of a plurality of magnetic cores 3a disposed at a predetermined interval in the linear displacement direction (the direction of arrows L,L̄) and non-magnetic spacers 3b interposed therebetween. For example, the cores 3a are of a cylindrical configuration with a length of about P/2 and the spacers 3b are also of the length of P/2. The coil operates with four phases which are distinguished, for convenience's sake, by reference characters A, B, C and D. The reluctance produced in each of the phases A, B, C and D in response to the relative position of the cores 3a with respect to the coils is 90° out of phase with that produced in each adjacent phase. The locations of the respective coils and the size and configuration of the cores 3a are so determined that if, for example, the phase A is a cosine phase, the phase B becomes a sine phase, the phase C a minus cosine phase and the phase D a minus sine phase.

In the example of FIG. 1, the primary coils 1A–1D and corresponding ones of the secondary coils 2A–2D are wound in the same location with the coil length of the respective coils being about P/2 (P being any number). The coils 1A, 2A of the phase A and the coils 1C, 2C of the phase C are provided adjacent to each other and the coils 1B, 2B of the phase B and the coils 1D, 2D of the phase D are also provided adjacent to each other. The interval between the coil group of the phases A and C and the coil group of the phases B and D is "P(n±¼)" (n being any natural number).

The coils 1A, 2A, 1C and 2C of the phases A and C are received in a cylindrical case 4 made of a magnetic substance such as iron and the coils 1B, 2B, 1D and 2D of the phases B and D are also received in a similar cylindrical case 5. These iron cases 4 and 5 function to prevent crosstalking between the respective coils and also increase the union of the magnetic circuit.

In a case where an output signal is to be obtained by the phase shift system, the coil group of the phases A and C whose phases of reluctance change are opposed to each other is excited by a common primary AC signal (for example, a sine wave signal) to produce a differential output and the coil group of the phases B and D whose phases of reluctance change are opposed to each other is excited by a common AC signal which is out of phase with the above mentioned AC signal by a predetermined angle (for example, a cosine wave signal) to produce a differential output. As a result, as a sum signal of the differential outputs of the phases A and C and the phases B and D, a signal which is equivalent to a signal being phase-shifted in the electrical angle of the primary AC signal by a phase angle corresponding to the linear position of the core section 3 (a linear displacement amount within the distance P) is obtained.

In the detection device as described above, the reluctance of each phase is determined in response to the amount of the relative displacement of the cores 3a and in this determination, a fixed value which is determined by a gap between the core section 3 and the coil section participates as an offset amount of reluctance of the magnetic circuit of each phase. On the other hand, resolution of detection for a minute displacement can be increased by shortening the interval P of the cores 3a. However, the fixed gap amount cannot be reduced in proportion to the reduction of the interval P and, besides, limitation is posed on such reduction by the mechanical structure of the device. Accordingly, the attempt to increase the resolution of detection by reduction of the interval P is likely to result in relative decrease in the width of reluctance change with respect to the displacement of the cores 3a, i.e., the ratio of the width of level change corresponding to the displacement to the secondary side induced voltage level and hence failure in obtaining an adequate accuracy.

It is therefore a first object of the present invention to increase the accuracy in detection in a linear position detection device of a type in which the reluctance change is produced in response to the displacement. It is another object of the invention to reduce the size of the device thereby to obtain sufficient accuracy in case the device is adapted for detection of a minute displacement.

A differential transformer in which a conventional iron core is replaced by a core made of a weak magnetic substance such as copper or aluminum is disclosed in Japanese Preliminary Patent Publication No. 1210/1982. This utilizes reluctance change due to the eddy current loss produced by a good conductive and weak magnetic metal in the magnetic field instead of the reluctance change responsive to the displacement of the strong magnetic core such as iron. This prior art eddy current type differential transformer cannot be employed, as the conventional iron core type differential transformer, for detection of a linear position other than that within a relatively short range. Further, since the detected linear position is estimated by the magnitude of the output analog voltage level, an erroneous operation is likely to take place due to disturbance and noise.

On the other hand, Japanese Preliminary Utility Model Publication No. 136718/1983 discloses, as a linear position detection device of a variable reluctance type, a phase shift type device in which a linear position is estimated by an electrical angle of an output AC signal.

In this device, magnetic substance cores of predetermined length are arranged at a predetermined interval and the linear position can be detected over a relatively long range. However, this device requires processing and assembling of a large number of magnetic substance cores and hence it is difficult to reduce the manufacturing cost.

It is therefore a second object of the invention to achieve, in a linear position detection device capable of producing change in the induction coefficient, detection of the linear position over a relatively long range and also detection of the linear position by a phase-shift system. It is another object of the invention to provide such linear position detection device at a relatively low cost.

U.S. Pat. No. 3,956,973 discloses a piston rod position detection device in which an annular or spiral groove is formed in the iron or other magnetic substance metal about the piston rod and a transducer which produces an electric pulse signal in response to entry of the groove accompanying the displacement of the piston rod is fixedly provided on the cylinder main body.

European Laid-open Patent Publication No. 0115008 discloses a piston rod position detection device in which magnetic rings are provided about a piston rod at a predetermined interval, primary windings and secondary windings of plural phases are provided on the cylinder main body, the primary windings of the respective phases are individually excited by AC signals which are out of phase from one another and an AC signal which is phase-shifted responsive to the position of the piston rod is produced on the secondary windings, and the amount of the phase shift is digitally counted whereby the piston rod position can be detected absolutely.

The above European Laid-open Patent Publication also discloses a piston rod position detection device in which a stator with a plurality of poles wound with primary and secondary windings is fixedly provided on the cylinder main body, a plurality of projections are provided on a magnetic substance portion about the piston rod, the primary windings of the respective phases are individually excited by AC signals which are out of phase with one another and an AC signal which is phase-shifted responsive to the piston rod position is obtained in the secondary windings, and the amount of the phase shift is digitally counted whereby the piston rod position can be detected absolutely.

Since the detection device disclosed in the above-mentioned U.S. Pat. No. 3,956,973 simply produces a pulse signal in response to entry of the groove formed in the piston rod, a construction for counting this pulse must be employed for obtaining this pulse signal which substantially results in an incremental pulse generation and counting system. Accordingly, this device has the defect that it cannot detect the piston rod position absolutely. Besides, the forming of the groove necessitates machine working of the piston rod which is a rather troublesome process.

The detection device disclosed in the above described European Laid-open Patent Publication is of an absolute system so that it has no problem described above concerning the absolute detection. However, the problem of requiring the troublesome processing or assembling of the magnetic rings or projections about the piston rod still remains unsolved in this device also.

Further, since all of the prior art devices are so constructed that the change in the induction coefficient can be produced by the presence or absence of the groove or projection of iron or magnetic metal, the depth of the groove or the height of the projection must be of a sufficient magnitude for securing a sufficient accuracy.

It is therefore a third object of the invention to provide a piston rod position detection device capable of solving the above described various problems.

SUMMARY OF THE INVENTION

It is a feature of the present invention that the change in the coefficient of induction can be obtained in an enhanced manner by utilizing not only the reluctance change (permeance change) but also the eddy current loss as parameters in an induction type linear position detection device.

More specifically, the linear position detection device achieving the first object of the invention includes a coil section being excited by one or more primary signals and producing a secondary output and a rod section being disposed in such a manner that it is capable of relative linear displacement with respect to said coil section and is characterized in that the rod section comprises a magnetic substance portion provided in predetermined part of the rod section and changing reluctance (permeability) of a magnetic circuit passing through the coil section in accordance with the relative linear displacement and a conductive substance portion provided in part of the section where the reluctance is caused to increase relatively (in other words, permeability, i.e., permeance is caused to decrease relatively) in such a manner that an eddy current path will be formed relative to flux and made of substance which is relatively weak magnetic or non-magnetic and relatively conductive as compared with the magnetic substance portion. By providing a conductive substance portion in correspondence to a section where the reluctance is caused to increase relatively in the core section, the eddy current loss is produced in this section whereby substantially reluctance is enhanced.

Thus, the induction factor change utilizing not only the reluctance change due to the displacement of the magnetic substance portion but also the eddy current loss due to the displacement of the conductive substance portion as parameters is obtained in an enhanced manner (the number of coil winding and other conditions are equivalent to the reluctance change since these conditions are fixed.). In the section where reluctance is caused to decrease relatively (i.e., permeance is caused to increase relatively) by entry of the magnetic substance portion of the core section into the magnetic circuit of the coil section, the influence of the eddy current loss by the conductive substance portion does not reach so that voltage of a relatively sufficiently high level can be induced in the secondary windings. On the other hand, in the section where reluctance is caused to increase relatively by removal of the magnetic portion of the rod section from the magnetic circuit of the coil section, the eddy current loss is produced by entry of the conductive substance portion of the rod section into the magnetic circuit of the coil section so that the relative increase in reluctance due to the eddy current loss on the conductive substance portion is added to the relative increase in reluctance due to the removal of the magnetic substance portion whereby the level of voltage induced in the secondary windings is further decreased. Thus, difference in the induced voltage in the secondary windings between the high level state and the low level state, i.e., the width of change of the secondary output relative to the displacement, can be made substantially large and the linear position can be detected with a high accuracy. For instance, a larger width of change of the secondary output with respect to a minute range of displacement can be ensured so that a minute displacement with high accuracy is possible.

The linear position detection device achieving the second object of the invention includes a coil section being excited by one or more primary AC signals and producing a secondary output and a rod section being disposed in such a manner that it is capable of relative linear displacement with respect to the coil section and is characterized in that the rod section is composed of a plurality of conductive substance portions provided repeatedly at a predetermined interval in the direction of the relative linear displacement, the respective conductive substance portions are provided in such a manner that an eddy current path relative to flux produced by the coil seciton will be formed and the conductive substance portions are made of substance which is weak magnetic or non-magnetic and relatively conductive as compared with substance of other portion of the rod section. As the conductive substance portions of the rod section enter the magnetic field made by the rod section, an eddy current is produced in the conductive substance portions and reluctance of the magnetic circuit passing through the coil section substantially increases by the eddy current loss. The amount of the eddy current loss changes with the degree of the entry of the conductive substance portions into the magnetic field and this is accompanied by the reluctance change. Accordingly, voltage corresponding to the relative linear position of the conductive substance portions of the rod section with respect to the coil section is induced on the secondary windings of the coil section.

By repeatedly providing such conductive substance portions in which the eddy current is produced at a predetermined interval, the linear position can be detected over a relatively long range. Further, by the provision of the plurality of conductive substance portions, the function of reluctance change with respect to the linear displacement can be made cyclic and, as a result, position detection by the phase shift system is made possible. It will be noted that the prior art device employing a single conductive substance core cannot impart a cyclic property to the reluctance change and therefore is hard to be adapted for the phase-shift system.

Since the eddy current has tendency to flowing near the surface of a conductive substance, the conductive substance portions to be provided in the rod section are not required to have a large thickness. Accordingly, the conductive substance portions can be deposited on the base portion of the rod section with a predetermined pattern. This means ease of manufacturing of the rod section. That is to say, such pattern on a relatively thin conductive substance portion can be formed relatively easily on the base portion of the rod section by such means as electroplating, flame spraying, pattern baking and etching or any other suitable surface treatment technique. Accordingly, the troublesome machine working and assembling required in the magnetic substance core system can be omitted and the manufacturing cost is expected to be reduced remarkably. It will be appreciated, however, that the present invention does not exclude a conductive substance portion formed by machining or assembling from its scope but such conductive substance portion may be utilized as well for the purpose of the invention.

In a case where the conductive substance portions can be deposited on the base portion of the rod section with a predetermined pattern from the beginning, there is no particular problem. Such deposition of the conductive substance portions from the beginning, however, is sometimes difficult depending upon the surface processing technique employed (e.g., electroplating). In view of such expected difficulty, the present invention provides the following method of manufacturing of the rod section: A selected conductive substance is first deposited over the entire surface of the rod section and thereafter an unnecessary portion of the conductive substance deposited on the base portion is removed leaving a predetermined pattern of the conductive substance thereby to form the conductive substance portions by the conductive substance left unremoved. For example, the deposition is made by electroplating and the removal is made by etching. This enables the rod section to be manufactured effectively. In a case where an unnecessary conductive substance is removed by etching, there arises the problem that the base portion of the rod section may also be eroded by the etching agent. Such problem can be coped with by first applying a coating resistive to such etching agent (e.g., a resin coating) over the entire periphery of the base portion of the rod section and thereafter depositing the conductive substance by electroplating or the like surface processing. By this method, the base portion of the rod section is protected by the resin coating in the etching process.

The present invention is also characterized in that the base portion of the rod section is made of a common material in an absolute type linear position detection device comprising a plurality of detection devices, whereby manufacture of the device is facilitated and the cost is further reduced.

The position detection device for a piston rod of a fluid powered cylinder achieving the third object of the invention is characterized in that the device comprises a coil section provided on the open end side of a cylinder main body and being excited by one or more primary AC signals and producing a secondary output, and a conductive substance portion provided in a predetermined section on a peripheral surface of a piston rod in such a manner that an eddy current path relative to flux produced by the coil section will be formed. This conductive substance portion is made of substance which is weak magnetic or non-magnetic and conductive as compared with substance of other portion of the piston rod. The amount of an eddy current flowing through the conductive substance portion changes with relative linear displacement of the conductive substance portion with respect to the coil section caused by displacement of the piston rod thereby to produce a secondary output signal in the coil section.

Another position detection device for a piston rod of a fluid pressure cylinder according to the invention is characterized in that the device comprises the above described coil section and a magnetic substance portion provided in a predetermined section on the peripheral surface of the piston rod in the direction of displacement of the rod and projecting from the peripheral surface and changing reluctance of a magnetic circuit passing through the coil section in accordance with a relative position of the magnetic substance portion with respect to the coil section, and a conductive substance portion provided in a place where the magnetic substance portion is not projecting on the peripheral surface of the piston rod so that an eddy current path relative to flux will be formed and made of substance which is relatively weak magnetic or non-magnetic and relatively conductive as compared with the magnetic substance portion.

As regards the section where the magnetic substance portion is projecting from the peripheral surface of the rod section, entry of the magnetic substance portion into the magnetic field by the coil section decreases reluctance of the magnetic circuit (in other words, permeability, i.e., permeance increases).

On the other hand, in the section where the magnetic substance portion is not projecting, reluctance increases (i.e., permeance decreases). The conductive substance portion is provided in the section where reluctance increases. Accordingly, as the conductive substance portion (the section where the magnetic substance portion is not projecting) enters the magnetic field by the coil section, an eddy current loss is produced in that section and thereby reluctance substantially is further increased.

BRIEF DESCRIPTION OF THE DRAWINGS

In the accompanying drawings,

FIG. 1 is a vertical section showing an example of a prior art variable reluctance type linear position detection device;

FIG. 2 is a vertical section showing an embodiment of the linear position detection device according to the invention;

FIG. 3 is a sectional view taken along lines III—III in FIG. 2;

FIG. 4 is a graph illustrating relationship between the secondary side output voltage level and the amount of displacement in the same embodiment;

FIG. 16 is a plan showing still another embodiment of the invention;

FIG. 17 is a plan showing still another embodiment of the invention;

FIG. 18 is a vertical section showing still another embodiment of the invention;

FIG. 19 is a plan of the plate-like rod section in FIG. 18;

FIG. 20 is a sectional view taken along lines IIX—IIX in FIG. 18;

FIG. 21 is a vertical section showing still another embodiment of the invention;

FIG. 22 is a plan of the plate-like rod section in FIG. 21;

FIG. 23 is a vertical section taken along lines IIXIII—IIXIII in FIG. 21;

FIG. 24 is a partly sectional side elevation showing still another embodiment of the invention;

FIG. 25 is a sectional view taken along lines V—V in FIG. 24;

FIG. 33 is a vertical section showing another embodiment of the linear position detection device according to the invention;

FIG. 34 is a sectional view taken along lines II—II in FIg. 33;

FIG. 35 is a vertical section showing a modification of the rod section of FIG. 33;

FIGS. 36 through 38 are vertical sections showing respectively other embodiments of the rod section of FIG. 33;

FIG. 44 is a flow chart showing an embodiment of the process for producing the rod section in the linear position detection device according to the invention;

FIG. 45 is a flow chart showing another embodiment of the process for producing the rod section;

FIG. 46 is a plan showing another embodiment of the invention in which two linear position detection devices are provided in parallel for detecting absolute linear position;

DESCRIPTION OF PREFERRED EMBODIMENTS

Figure 5:
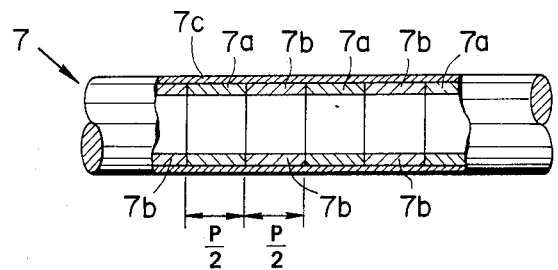
FIGS. 5 through 7 are vertical sections showing respectively other embodiments of the rod sections of FIG. 2.

In conjunction with the accompanying drawings, an embodiment of the invention will be described in detail.

Referring to FIGS. 2 and 3, the construction and arrangement of the coil section are substantially the same as those shown in FIG. 1. Primary and secondary coils 1A, 2A of the phase A and primary and secondary coils 1C, 2C of the phase C are housed in a cylindrical magnetic substance case 4 through a partition wall. Likewise, primary and secondary coils 1B, 2B of the phase B and primary and secondary coils 1D, 2D of the phase D are housed in a cylindrical magnetic substance case 5 through a partition wall. The cases 4 and 5 housing these coils are aligned with each other in their hollow central axis and are fixed to each other with the axial distance between middle points thereof being $P(1+\frac{1}{4})$. In the space in these cases, i.e., the space in the coils, is inserted a rod section 6 in such a manner that it is capable of relative linear displacement with respect to the coil section.

The central portion 6 of the rod section 6c is made of a magnetic substance and there are provided annular magnetic substance portions 6a projecting from the central portion 6 with a predetermined width P/2 and at a predetermined interval P/2 in the linear displacement direction (the direction of arrows L and $\overline{L}$). Respective recesses defined by respective adjacent magnetic substance portions 6a are fitted with annular conductive substance portions 6b. The width of each annular conductive substance portion 6a also is P/2. The central portion 6c and the magnetic substance portions 6a are made of iron or other strong magnetic substance whereas the conductive substance portions 6b are made of a relatively weak magnetic substance as compared with the magnetic substance portions 6a or a non-magnetic substance and also of substance of relatively good conductivity (e.g., copper, aluminum or brass, or mixture of substance of such good conductivity and other substance).

In the above described construction, flux produced by the primary coils 1A–1D of the respective phases passes through the magnetic substance cases 4 and 5 and the central portion 6c of the rod section 6. Gaps formed between the inner peripheries of the cases 4 and 5 and the projecting magnetic substance portions 6a of the rod section 6 are narrower than gaps formed between these inner peripheries and the surface of the central portion 6c under the conductive substance portions 6b of the rod section 6. Besides, the width P/2 of the magnetic substance portions 6a and the conductive substance portions 6b substantially corresponds to the length of each coil. When, accordingly, the rod section 6 makes relative linear displacement with respect to the coil section, reluctance of the magnetic circuit in each phase changes in accordance with relative position of the magnetic substance portions 6a relative to the coils of each phase. As is well known, the more of the magnetic substance portion 6a occupies the space in a coil (e.g., the state of the phase C in FIG. 2 in which the portion 6a occupies the maximum space), the smaller is reluctance and therefore the larger is permeance. As will be apparent from this, the conductive substance portions 6b provided between the magnetic substance portions 6a are located in portions in which reluctance in the rod section 6 is relatively increased (i.e., portions in which permeance is relatively decreased). Besides, each of the conductive substance portions 6b is of an annular conffiguration with respect to the central portion 6c which constitutes a magnetic path whereby the portion 6b functions as a so-called short ring providing an eddy-current path with respect to the flux. Accordingly, the more of the conductive substance portion 6b occupies the space in a coil (e.g., the state of the phase A in FIG. 2 in which the portion 6b occupies the maximum space), the larger is the eddy current and so is reluctance which substantially is caused to increase by the eddy-current loss. On the other hand, as described above, reluctance relatively increases in the conductive substance portion 6b due to absence of the magnetic substance portion 6a. Accordingly, reluctance increases cumulatively and the level of induced voltage in the secondary coil attenuates in an enhanced manner.

The above described phenomenon is schematically illustrated in FIG. 4. The level of the induced voltage in a secondary coil in a certain phase (e.g., 2A) owing to the magnetic substance portion 6a only is as shown by a solid line with respect to relative linear displacement within a range of distance P, whereas in a portion in which the level is relatively attenuated, attenuation in the induced voltage due to the eddy-current loss in the conductive substance portion 6b is added as shown by a dotted line so that the range of variation in the level of the induced voltage with respect to a given amount of displacement (e.g., VL1, VL2) is greater in the case where the variation due to the magnetic substance portion 6a and the variation due to the conductive substance portion 6b are added together (i.e., VL2) than in the case where the magnetic substance portion 6a only contributes to the variation (i.e., VL1).

In the above described embodiment, the central portion 6c of the rod section 6 is made of magnetic substance similar to the magnetic substance portion 6a. The material of the central portion 6c, however, is not limited to such material but the central portion 6c may be made of a suitable non-magnetic substance or it may be a hollow space.

Figure 6:
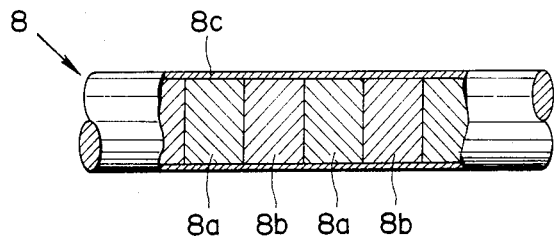
Figure 7:
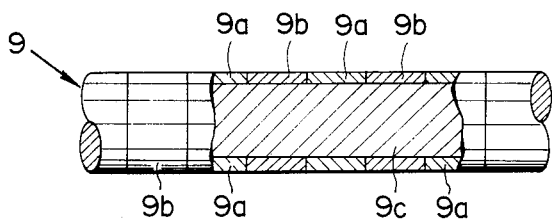

FIGS. 5–7 illustrate modified examples of the rod section 6 which can be substituted for the rod section 6 shown in FIG. 2. A rod section 7 of FIG. 5 is composed of a tube 7c made of a non-magnetic substance and annular magnetic substance portions 7a and annular conductive substance portions 7b each having a width P/2 which portions 7a and 7b are fitted alternately in the tube 7c. The central portion of the rod section 7 is a hollow space. This example has the benefit that it is light because the central portion is hollow. A rod section 8 shown in FIG. 6 is composed of a tube 8c made of a non-magnetic substance and disc-shaped magnetic substance portions 8a and disc-shaped conductive substance portions 8b each having a width P/2 which portions 8a and 8b are fitted alternately in the tube 8c. The tubes 7c and 8c may be formed by molding or coating of synthetic resin. Such molding or coating of the surface by a non-magnetic substance may be applied also to the rod section 6 or any other type of rod section. A rod section 9 shown in FIG. 7 is composed of a core 9c made of a non-conductive and non-magnetic substance and annular magnetic substance portions 9a and annular conductive substance portions 9b each having a width P/2 which portions 9a and 9b are alternately disposed about the core 9c. The core 9c may be made of a magnetic substance similar to the magnetic substance portions 9a in which case the rod section 9 assumes substantially the same construction as the rod section 6 shown in FIG. 2. Alternatively, the rod 9c may be made of a weak magnetic substance or a non-magnetic substance similar to the conductive substance portion 9b. The material and other conditions of the respective magnetic substance portions 7a, 8a and 9a and the respective conductive substance portions 7b, 8b and 9b are the same as those for the magnetic substance portion 6a and the conductive substance portion 6b in FIG. 2.

Figure 8:
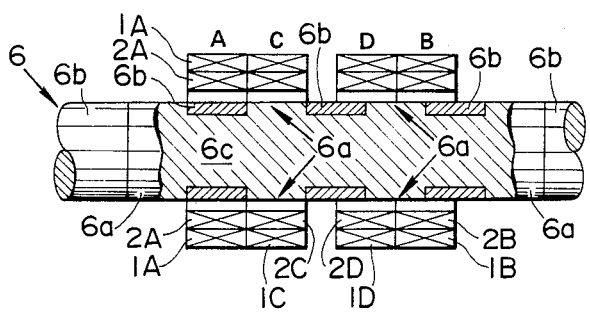
FIG. 8 is a vertical section showing a modified example of FIG. 2.
Figure 9:
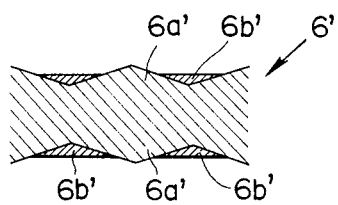
FIG. 9 is a vertical section showing another embodiment of the rod section of the invention.

In the embodiment shown in FIG. 2, the coils in the respective phases are housed in the cylindrical magnetic substance cases 4, 5 to provide a magnet-conductive path. The invention can be worked without providing such magnetic substance cases, however, as shown in FIG. 8. The example shown in FIG. 8 has the same arrangement as that shown in FIG. 2 except that coils 1A–1D, 2A–2D of the respective phases A–D are housed in unshown non-magnetic non-conductive cases rather than in the magnetic substance cases. The rod section 6 shown in FIG. 8 may be replaced with any one of the rod sections 7 to 9 shown in FIGS. 5 to 7, respectively. The magnetic substance portion 6a of the rod section 6 in the examples shown in FIGS. 2 to 8 may have a longitudinal cross section in which, as shown in FIG. 9, the portion 6a' has tapered surfaces rather than right-angle corners. The reference character 6' designates a rod section, 6a' a tapered magnetic substance portion and 6b' a conductive substance portion.

Figure 10:
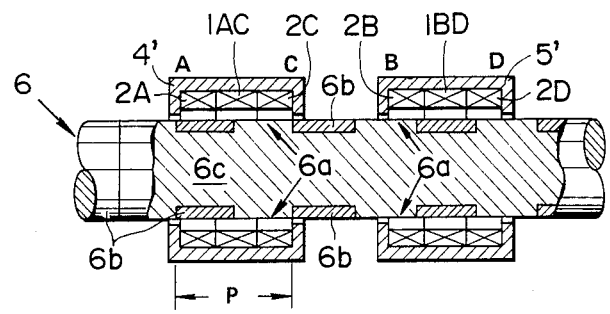
FIG. 10 is a vertical section showing another embodiment of the invention.

The construction of the coil section, including the number of coils, is not limited to that shown in FIGS. 2 to 8 but can be varied as the case may be. For instance, in the example shown in FIG. 10, a magnetic substance case 4' having a length of P houses a secondary coil 2A of the phase A, a primary coil 1AC common to the phases A, C, and a secondary coil 2C of the phase C, using thirds of said length P, respectively. Likewise, a magnetic substance case 5' houses a secondary coil 2B, a common primary coil 1BD, and a secondary coil 2D. As before, the rod section 6 may be replaced with any one of the rod sections 7 to 9 and 6' shown in FIGS. 5 to 7 and 9. The magnetic substance cases 4', 5' may be dispensed with.

While each of said embodiments is so constructed that the rod section is disposed in the space defined by the coil section, the construction of each embodiment may be varied as required.

Figures 11, 12:
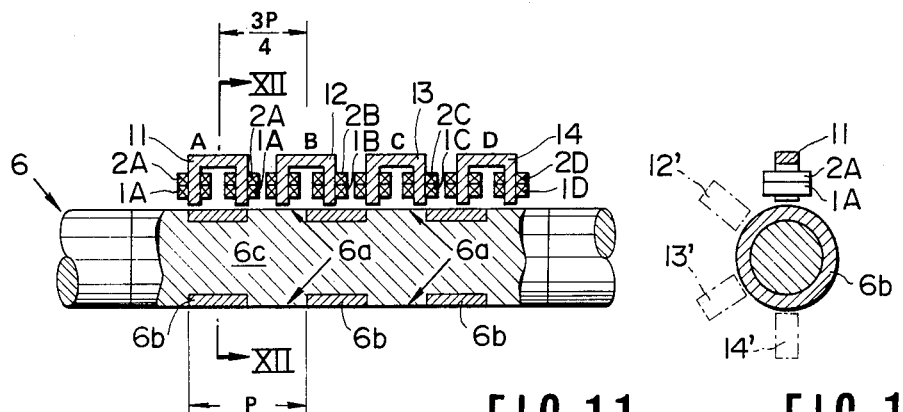
FIG. 11 is a vertical section showing still another embodiment of the invention.
FIG. 12 is a sectional view taken along lines XII—XII in FIG. 11.

FIG. 11 shows a modification of the coil section and FIG. 12 shows the cross section along line XII—XII on FIG. 11. The primary and secondary coils 1A–1D, 2A–2D of the respective phases A–D are wound on both arms of U-shaped magnetic substance cores 11, 12, 13, 14 provided for the respective phases. The cores 11 to 14 of the coil section of the phases A–D are so disposed and fixed in relation to each other that the cycle of reluctance change in one of the phases A–D is ¼ cycle (90 degrees) out of phase with respect to the adjacent phases. For instance, each of the cores 11 to 14 is spaced 3P/4 (broadly, $P(1+\frac{1}{4})$) apart from the adjacent cores. The rod section 6 has a similar construction to that shown in FIG. 2. Each of the U-shaped cores 11 to 14 has both ends apart by a distance substantially corresponding to the width P/2 of the magnetic substance portion 6a and the conductive portion 6b. There is formed in each phase the magnetic circuit passing from one end of each of the U-shaped cores 11 to 14 through the rod section 6 to the other end of the core. In this example, too, the rod section 6 may be replaced with any one of the rod sections 7 to 9 and 6' shown in FIGS. 5 to 7 and 9. While in the embodiment shown in FIG. 11 the cores 11 to 14 of the respective phases are aligned in the linear displacement direction, the cores may be shifted in a circumferential direction as shown by dotted lines 12', 13', 14'. Thus the distance in the linear displacement direction between the phases adjacent to each other may be much smaller than 3P/4 (e.g. P/4). In the example shown in FIG. 11, the eddy-current path created in the conductive substance portion 6b is formed about the flux path transverse to the end portions of the cores 11 to 14 rather than in an annular form. Therefore, the conductive substance portions 6b to 9b and 6a' of the respective rod sections 6 to 9 and 6' need not necessarily be of annular form but need only possess a certain area in the positions opposite to the end portions of the cores 11 to 14.

The rod section need not necessarily be of a round bar configuration as shown in the above embodiments but may be of a plate-like configuration. A detector with a plate-like rod section may be advantageously fitted in a position where a rod section of a round bar configuration cannot be fitted in a suitable manner.

Figures 13, 15:
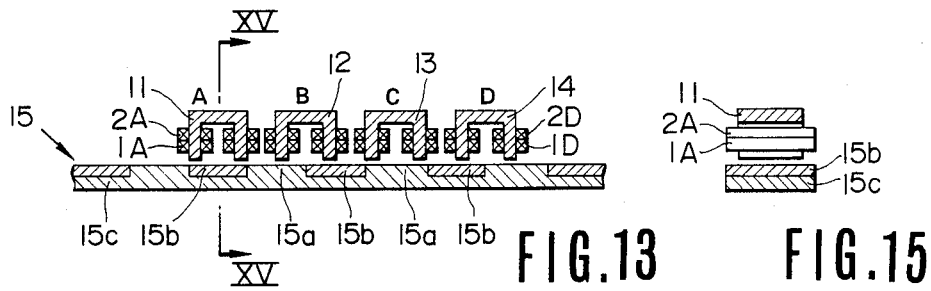
FIG. 13 is a vertical section showing still another embodiment of the invention.
FIG. 15 is a sectional view taken along lines XV—XV of FIG. 13.
Figure 14:
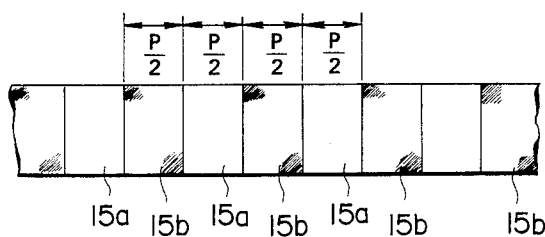
FIG. 14 is a plan view showing a plate-like rod section of FIG. 13.

In the embodiment shown in FIG. 13, the coil section comprises the U-shaped cores 11 to 14 respectively provided for the phases A–D aligned in the linear displacement direction and disposed at a given space interval of 3P/4, as in the embodiment shown in FIG. 11, and the primary and secondary coils 1A–1D, 2A–2D wound on the cores 11 to 14, respectively. A plate-like rod section 15 is disposed with a given gap from the end portions of the cores 11 to 14 and linearly displaceable relative to the core section. There are provided on that side of the plate-like rod section 15 opposite to the end portions of the cores 11 to 14 a plurality of magnetic substance portions 15a and conductive substance portions 15b alternately at intervals of P/2. FIG. 14 is a top plan view of the plate-like rod section 15. By way of example, the plate-like rod section 15 comprises a base portion 15c and magnetic substance portions 15b both made of the same material. The magnetic substance portions 15a are plurality of projections on the base portion 15c at intervals of P/2. The recess defined between the portions 15a are filled with conductive substance portions 15b. As a matter of course the magnetic substance portions 15a and the conductive substance portions 15b are made of the same materials as the magnetic substance portions 6a and conductive substance portions 6b of the rod section 6 shown in FIG. 2, respectively. FIG. 15 is a cross section along line XV—XV on FIG. 13. The base portion 15c need not necessarily be made of a magnetic substance but may be made of any suitable material such as non-magnetic and non-conductive substance or the same material as that of which the conductive substance portion 15b is made.

While in the embodiment shown in FIG. 13, the cores 11 to 14 of the coil section of the respective phases A–D are aligned in the linear displacement direction, these cores 11 to 14 may be so disposed as to make a line at an angle to the linear displacement direction at intervals of P/4, as shown in FIG. 16. Alternatively, the cores 11 to 14 of the respective phases A-D may be aligned transverse to the linear displacement direction while shifting the magnetic substance portions 17a and the conductive substance portions 17b respectively corresponding to the phases A-D by P/4 in relation to each other, as shown in FIG. 17. FIGS. 16 and 17 are both top plan views: The primary and secondary coils are wound on the arms of the cores 11 to 14 of the coil section of the phases A-D, as in the embodiment shown in FIG. 13. The plate-like rod section 16 has a plurality of alternately disposed magnetic substance portions 16a and the conductive substance portions 16b in exactly the same manner as does the rod section 15 shown in FIG. 13. The rod section 16, however, possesses a narrower width than the rod section 15. The magnetic substance portions 17a and the conductive substance portions 17b are disposed at intervals of P/2 alternately while these portions are shifted P/4 in the linear displacement direction in relation to those in the adjacent phases.

While in the embodiments shown in FIGS. 13 to 17, both end portions of each of the U-shaped cores 11 to 14 of the coil section are disposed opposite to only one side of the flat rod section, C-shaped cores 18 to 21 of the respective phases as shown in FIG. 18 may be used so that a plate-like rod section 22 may be disposed between both end portions of each of these cores. FIG. 19 is a top plan view of the flat rod section 22 and FIG. 20 a cross section along line IIX—IIX on FIG. 18. On the cores 18 to 21 of the phases A-D are wound the primary and secondary coils 1A-1D as before. There are provided on both sides of the plate-like rod section 22 magnetic substance portions 22a and conductive substance portions 22b in an alternate order at intervals of P/2 in the linear displacement direction. These magnetic substance portions 22a and the conductive substance portions 22b may be provided on only one side of the rod section 22.

In the embodiment shown in FIG. 21, a plate-like rod section 45 is disposed between both end portions of C-shaped cores 18 to 21 of the coil section of the respective phases, as those shown in FIG. 18. FIG. 22 is a top plan view of the flat rod section 45, and FIG. 23 a cross section along line IIXIII—IIXIII on FIG. 21. The plate-like rod section 45 45 is provided on both its sides with annular conductive substance portions 45b. On both sides of the rod section of which the base portion is made of a magnetic substance, there are provided a plurality of projections in the linear displacement direction, each P/4 wide and spaced by a distance of 3P/4 from each other. These projections form the magnetic substance portions 45a. Said square annular conductive portions 45b are provided in the recesses each 3P/4 wide between these projections (magnetic substance portions 45a). As before, the magnetic substance portions 45a and the conductive substance portions 45b may be provided only on one side of the rod section 45.

In the embodiment shown in FIG. 24, a magnetic substance portion 46a and a conductive substance portion 46b are alternately provided helically round a rod section 46 in the form of a single-thread screw with a pitch of P. The magnetic substance portion 46a corresponds to the screw thread and the conductive substance portion 46b (a relatively weak magnetic substance or non-magnetic substance but a good conductor, like the conductive substance portions previously described) is provided in the groove 46b' of the screw. In FIG. 24, the portion 46a (the magnetic substance portion) corresponding to the screw thread and the groove 46b' are shown in elevation while the conductive substance portion 46b is fitted in the groove 46b' is shown in section for the sake of convenience. FIG. 25 is a cross section along line V—V on FIG. 24. As shown in FIG. 25, there are provided on the periphery of the rod section 46 U-shaped cores 47 to 50 of the phases A-D 90° apart from each other. On each of these cores 47 to 50 are wound the primary coils 1A to 1D and the secondary coils 2A to 2D. There exists a certain gap between the end portions of each of the cores 47 to 50 and the periphery of the rod section 46.

Figure 26:
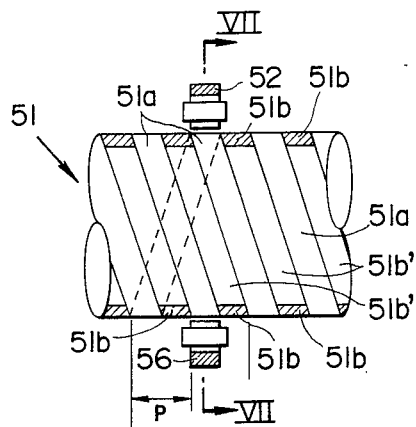
FIG. 26 is a partly sectional side elevation showing still another embodiment of the invention.
Figure 27:
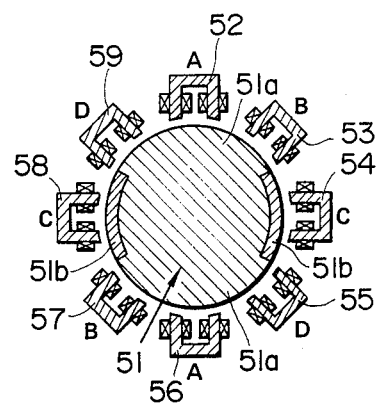
FIG. 27 is a sectional view taken along lines VII—VII in FIG. 26.

In the embodiment shown in FIG. 26, magnetic substance portions 51a and the conductive substance portions 51b are helically provided about the periphery of the rod section 51 in an alternate order in the form of a double-thread screw with a pitch of 2P. As before, the magnetic substance portions 51a correspond to the screw threads and the conductive substance portions 51b are provided in the grooves 51b'. As in FIG. 24, the thread portions (magnetic substance portions) 51a and the grooves 51b' are shown in elevation while the conductive portions 51b are shown in cross section. FIG. 27 is a cross section along line VII—VII on FIG. 26. About the periphery of the rod section 51 are provided eight cores 52 to 59 45° apart from each other in the circumferential direction. Each of four pairs of opposite cores, 180° apart from one another, are in phase and these four pairs of cores form the phases A-D, respectively. On each of the cores 52 to 59 of the phases A-D are wound the primary coils 1A to 1D and the secondary coils 2A to 2D, as before. The outputs of the secondary coils in phase are added to one another.

In FIGS. 24 to 27, the rod section 46 or 51 linearly displaces (in the direction of arrow L or $\overline{L}$) relative to the coil section consisting of the cores 47 to 50 or 52 to 59 of the phases A-D fixed with respect to each other in such space relationship as shown. Thus the embodiments shown in FIGS. 24 to 27 operate in the same manner as those described previously. An eight-pole type of coil section as shown in FIG. 27 (the coils 180° apart from each other being in phase) has a merit that even though the gaps between the periphery of the rod section and the end portions of the cores 52 to 59 vary as the center of the rod section is somewhat biassed in relation to the centers of the cores, addition of the outputs of the opposite coils 180° apart and in phase compensate for the errors in the outputs caused by the biassed position of the rod section in relation to the cores. The magnetic substance portions 46a, 51a and the conductive substance portions 46b, 51b may be provided only in the positions opposite to the cores 47 to 50, 52 to 59 of the respective phases.

Figure 28:
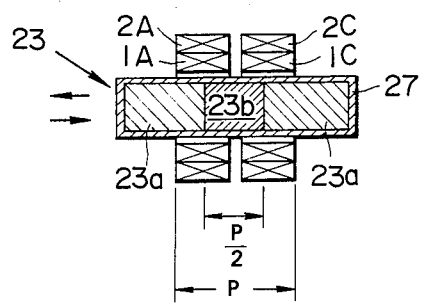
FIG. 28 is a vertical section showing still another embodiment of the invention.
Figure 29:
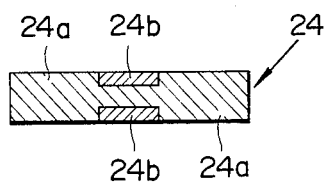
FIGS. 29 through 31 are respectively vertical sections showing modifications of the rod section of FIG. 28.
Figure 30:
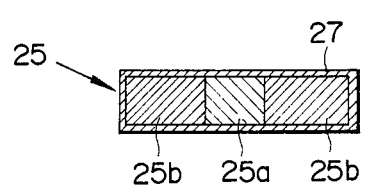
Figure 31:
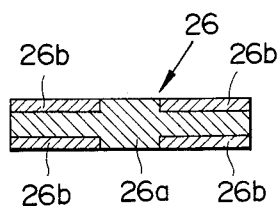

While in the embodiments described above, the rod section is provided with a plurality of magnetic substance portions and conductive substance portions in an alternate order so as to obtain a wide range of periodical reluctance change, only one period of reluctance change may be obtained within a limited range of linear displacements. FIG. 28 shows such an example wherein a cylindrical rod section 23 is disposed in the space defined by a coil section consisting of the primary and secondary coil 1A, 2A, 1C, 2C of the phases A, C. The middle portion of the rod section 23 is a conductive substance portion 23b with a given width of P/2 sandwiched by magnetic substance portions 23a. This construction enables only one period of reluctance change to be produced within the range of P. The rod section 23 may be replaced with a rod section 24, 25 or 26 shown in FIGS. 29, 30 or 31. The rod section 24 is provided with an annular conductive substance portion 24b. The rod section 25 is provided with conductive substance portions 25b and a magnetic substance portion 25a disposed in a reversed position relationship as compared to those shown in FIG. 28. The rod section 26 is provided with annular conductive portions 26b. Reference numeral 27 designates a non-magnetic tube.

In the embodiments shown in FIGS. 2 to 27, the output signal according to the relative linear position of the rod section can be obtained by the phase shift method. Specifically, periodical reluctance changes having a period corresponding to the linear displacement amount P of the rod section occur in the respective phases A-D such that these reluctance changes are 90° (P/4) out of phase with respect to those in the adjacent phases. Accordingly, for the phase angle $\phi$ corresponding to the linear displacement, the voltage levels induced in the secondary coils 2A to 2D of the respective phases A-D can be expressed as approximately cos $\phi$ in the phase A, sin $\phi$ in the phase B, −cos $\phi$ in the phase C, and −sin $\phi$ in the phase D ($2\pi$ corresponds to P) according to the relative linear position (namely $\phi$). The primary coils 1A, 1C of the phases A, C are excited by a sine wave signal sin $\omega t$ while the primary coils 1B, 1D of the phases B, D are excited by a cosine wave signal cos $\omega t$. In the pair of phases A and C, the output signals of the secondary coils 2A, 2C are added differentially and in the pair of phases B and D, the outputs of the secondary coils 2B, 2D are also added differentially. The differential output signals of these pairs are added so as to synthesize the final output signal Y. Thus the output signal Y can be substantially expressed in such an abbreviated equation:

$$Y = \sin\omega t \cos\phi - (-\sin\omega t \cos\phi) + \cos\omega t \sin\phi - (-\cos\omega t \sin\phi)$$
$$= 2 \sin\omega t \cos\phi + 2 \cos\omega t \sin\phi$$
$$= 2 \sin(\omega t + \phi)$$

The coefficient in the above equation, for which "2" is placed for the sake of convenience, may be replaced with a constant K, which is determined according to various conditions, to obtain $$Y = K \sin(\omega t + \phi)$$

in which $\phi$ corresponds to the relative linear position, so that the linear position can be detected by determining the phase difference $\phi$ of the output signal Y in relation to the primary AC signal sin $\omega t$ (or cos $\omega t$).

Figure 32:
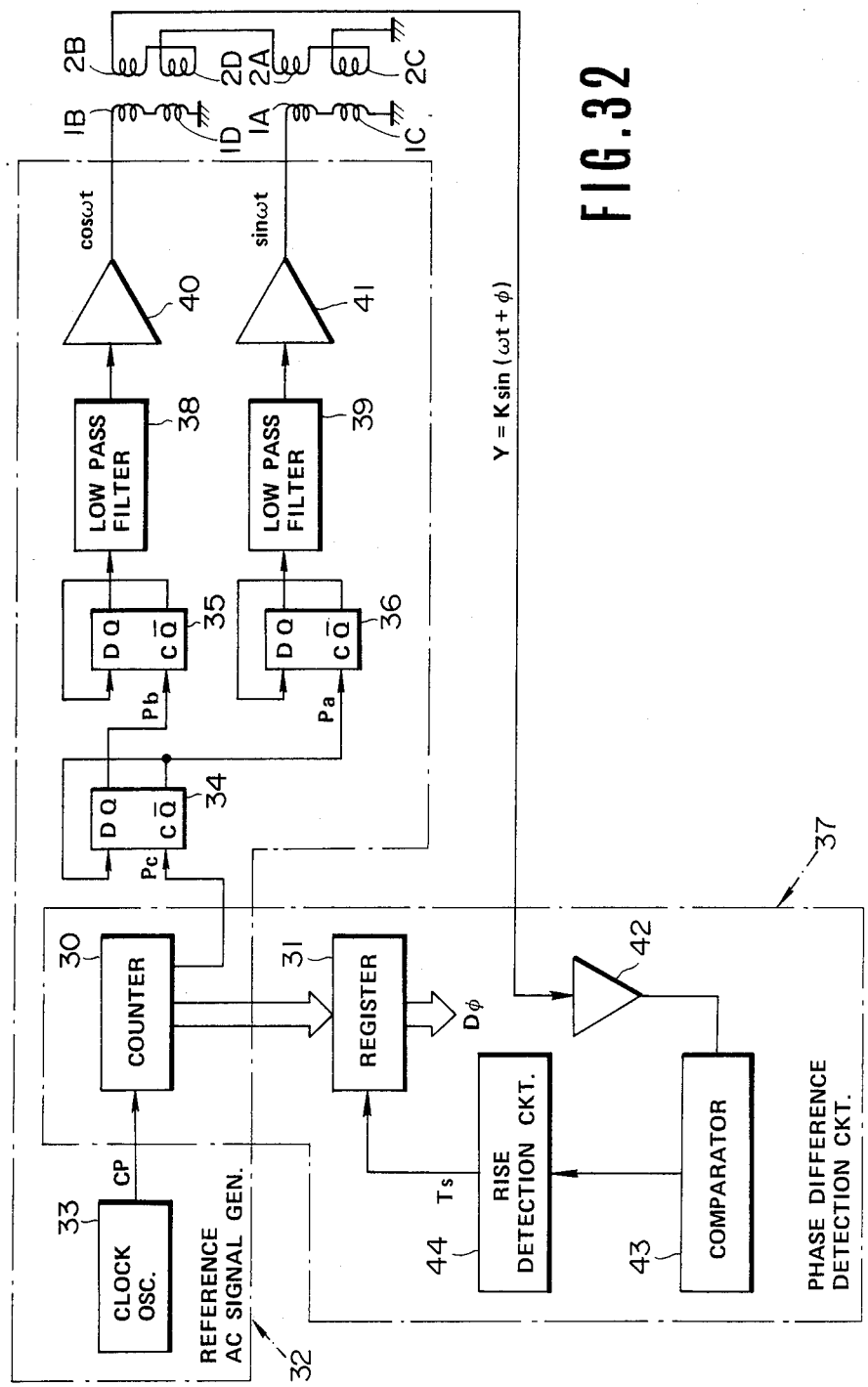
FIG. 32 is a block diagram showing an example of a circuit which operates the linear position detection device according to the invention by the phase-shift system and performing measurement of the electric phase-shift amount responsive to the linear position.

Means for obtaining the phase difference $\phi$ between the output signal Y and the reference AC signal sin $\omega t$ (or cos $\omega t$) may be suitably constructed. FIG. 32 shows an example of such circuit in which the phase difference $\phi$ is obtained in a digital value. Though not shown in the figure, the phase difference $\phi$ may also be obtained in an analog value by employing an integration circuit to compute a time difference at a predetermined phase angle (e.g. 0 degree) between the reference AC signal sin $\omega t$ and the output signal $Y = K \sin(\omega t + \phi)$.

In FIG. 32, a reference AC signal generation circuit 32 is a circuit for generating a reference AC sine signal sin $\omega t$ and a reference AC cosine signal cos $\omega t$ and a phase difference detection circuit 37 is a circuit for measuring the phase difference $\phi$. A clock pulse CP generated by a clock oscillator 33 is counted by a counter 30. The counter 30 is of a modulo M, where M is a suitable integer, and its count is provided to a register 31. A pulse Pc which is obtained by 4/M frequency-dividing the clock pulse CP is delivered from a 4/M frequency divided output of the counter 30 and supplied to a C-input of a ½ frequency-dividing flip-flop 34. A pulse Pb provided from a Q output of the flip-flop 34 is applied to a flip-flop 35 and a pulse Pa provided from a $\overline{Q}$ output of the flip-flop 34 is applied to a flip-flop 36. Output signals of these flip-flops 35 and 36 are processed through low-pass filters 38, 39 and amplifiers 40, 41 whereby the cosine signal cos $\omega t$ and the sine signal sin $\omega t$ are obtained and applied to primary coils 1A–1D of respective phases A–D. M counts in the counter 30 corresponds to the phase angle of $2\pi$ radian of these reference signals cos $\omega t$ and sin $\omega t$. In other words, 1 count in the counter 30 represents a phase angle of $2\pi/M$ radian.

The synthesis output signal Y of the secondary coils 2A–2D is applied to a comparator 43 through an amplifier 42 and a square wave signal corresponding to the positive or negative polarity of the signal Y is provided by the comparator 43. A rise detection circuit 44 produces a pulse Ts in response to the rise of the output signal of the comparator 43 and the count value of the counter 30 is loaded in the register 31 in response to this pulse Ts. As a result, a digital value D$\phi$ corresponding to the phase difference $\phi$ is loaded in the register 31. Thus is obtained data $\phi$ indicating in an absolute value the linear position within a given range P.

The signal processing method is not limited to said phase shift method; as in the ordinary transformer, an analog voltage according to the linear position may be obtained by rectifying the differential output of the secondary coil. In that case, the coil section may include only the phases A and C or B and D. Even when the phase shift method is employed, the coil section need not necessarily consist of four phases A–D but ma include only the phases A and B or three phases 120° apart from each other or six phases or may be constructed otherwise.

The rod section 6 of a circular cross section or threaded rod section 46 or 51 are manufactured, by way of example, as follows. A magnetic substance rod is worked upon by means of a machine so as to form an annular or spiral groove or grooves where the conductive portions 6b, 46b or 51b are to be fitted. Then a given conductive substance is applied onto the rod surface by plating, flame spraying, pattern baking, or other suitable surface processing, whereon the rod surface is ground so that the conductive portions 6b, 46b or 51b may remain in the groove only. As a matter of course, the conductive substance may be filled only into a given pattern of the conductive substance portion by a surface processing (e.g., flame spraying or pattern baking), in which case, the final grinding is made unnecessary. While the plate-like rod sections 15, 16, 17, 22 and 45 can be produced in a similar manner as the cylindrical rod sections, the grooves in which to fit the conductive portions can be formed not only by machine working but by etching or the like, which is convenient for minute working on conductive substance portions of a desired pattern.

It is possible to use a plurality of linear position detectors according to the invention, with the respective lengths of P, and apply these detectors to the absolute linear position detector as described in Japanese Preliminary Patent Publication No. 79114/1984. In that case, it is suitable to form more than one row of conductive portions in various P patterns on the same rod section.

Referring now to FIGS. 33 through 45, embodiments of the linear position detection device capable of producing reluctance change by the eddy current loss alone will be described. In these embodiments, the magnetic substance portions between the respective conductive substance portions in the embodiments of FIGS. 2 and 27 may be removed so that the eddy current loss caused by the conductive substance portions only will participate in change in the coefficient of induction (reluctance change).

In FIGS. 33 and 34, the coil section comprises primary coils 1A–1D and secondary coils 2A–2D and a rod section 60 is inserted in a coil space defined by these coils such that the rod section is capable of relative linear displacement. The rod section 60 comprises a relatively elongated center rod 60a and conductive substance portions provided annularly about this center rod 60a. The width of these conductive substance portions 60b is P/2 (P being any number). The conductive substance portions 60b are repeatedly disposed at a predetermined interval P/2 in the direction of relative linear displacement (the direction of arrows L, $\overline{L}$ in the figure). These conductive substance portions 60b are made of a substance which is weak magnetic or non-magnetic and relatively conductive as compared to the center rod 60a. Suitable material is copper, aluminum or brass or a mixture or compound of such conductive substance and other material. The center rod 60a may be made of a magnetic substance or a non-magnetic substance and either metal or non-metal (synthetic resin, glass, ceramic, etc.). The center rod 60a has only to be made of a substance having a large electric resistance than the conductive substance portions 60b (less conductive substance). This is for causing more eddy current to flow in the intermittently provided conductive substance portions 60b and thereby obtaining a periodic reluctance change relative to the displacement.

In the above described construction, flux produced by the primary coils 1A–1D of the respective phases passes through magnetic substance cases 4 and 5 and the rod section 60 and, when the conductive substance portions 60b enter the magnetic field, an eddy current flows along the rings of the conductive substance portions 60b in accordance with the amount of entry of the portions 60b. The more of the conductive substance portions 60b occupy the coil space (e.g., the state of the phase A in FIG. 33 in which the portion 60b occupies the maximum space), the larger is the eddy current produced. Conversely, in a state where the conductive substance portion 60b has not entered the coil space at all (e.g. the state of the phase C in FIG. 33), little eddy current flows. In this manner, the eddy current flows in the conductive substance portions 60b in accordance with the degree of entry of the conductive substance portions 60b in the coils of the respective phases and the reluctance change due to this eddy current loss is produced in the magnetic circuit of each phase. An AC signal of a level corresponding to this reluctance is induced in the secondary coils 2A–2D of the respective phases.

In the example of FIG. 33, there is space between the respective conductive substance portions 60b. Alternatively, as shown in FIG. 35, a suitable filling material or coating 61 may be filled in this space. The filling material 61 is a substance which is non-conductive or less conductive than the conductive substance portions 60b and non-magnetic or weak magnetic. This filling material 61 may not only be filled in the space between the respective conductive substance portions 60b but be applied on the entire outer periphery of the rod section 60 as illustrated. This filling material or coating 61 consists, for example, of chrome plating.

FIGS. 36 through 38 shows different examples of the rod sections which can replace the rod section 60 shown in FIG. 33. A rod section 62 of FIG. 36 is composed of a tube 62c and annular conductive substance portions 62b and spacers 62a each having a width P/2, which portions 62b and spacers 62a are fitted alternately in the tube 62c. The central portion of the rod section 62 is hollow so that it has the benefit that it is light. A rod section 63 of FIG. 37 is composed of a tube 63c and disc-like conductive substance portions 63b and spacers 63a each having a width P/2, which portions 63b and spacers 63a are fitted alternately in the tube 63c. The conductive substance portions 62b, 63b are made of a substance which is of a similar electrical and magnetic properties and the tubes 62c, 63c and the spacer 62a, 63a are non-conductive or less conductive than the conductive substance portions and non-magnetic or weak magnetic. A rod section 64 of FIG. 38 has a central rod 64a formed with an annular groove and conductive substance portions 64b. Accordingly, annular projections 64c provided about the central rod 64a are disposed between the respective conductive substance portions 64b. The central rod 64a is made of a substance which is non-conductive or less conductive than the conductive substance portions 64b and non-magnetic or weak magnetic.

The modifications of the coil section as shown in FIGS. 8, 10, 11 and 12 are applicable also in the detectors shown in FIGS. 33 through 38.

Figures 39, 41:
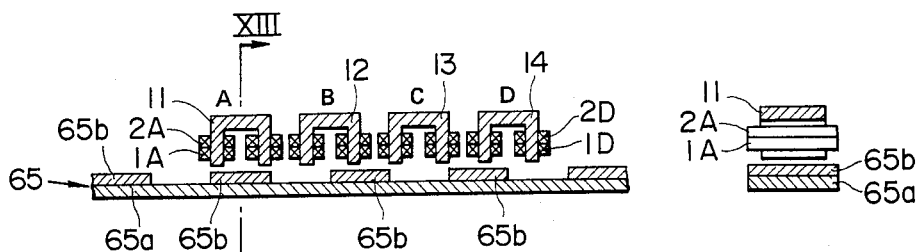
FIG. 39 is a vertical section showing still another embodiment of the invention.
FIG. 41 is a vertical section taken along lines XIII—XIII in FIG. 39.
Figure 40:
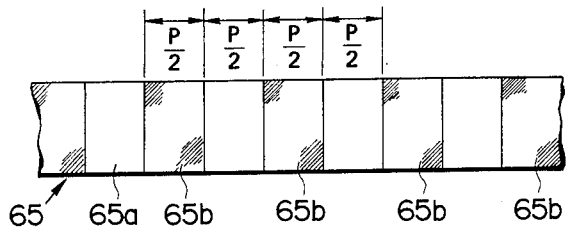
FIG. 40 is a plan showing the plate-like rod section of FIG. 39.

In the same manner as was previously described, the rod section is not limited to the round bar type but it may be of a plate-like configuration. FIGS. 39 through 41 show embodiments corresponding to FIGS. 13–15 in which the construction of the plate-like rod section 65 is different from the plate-like rod section 15. The plate-like rod section 65 has constructive substance portions 65b provided repeatedly at a predetermined interval on the side facing the end portions of cores 11–14. FIG. 40 is a plan view of the plate-like rod section 65. The conductive substance portions 65b are made of a material which is the same as or similar to the conductive substance portions 60b of FIG. 33 and base portion 65a is of a material which is the same as or similar to the central rod 60a of FIG. 33. FIG. 41 is a sectional view taken along lines XIII—XIII in FIG. 39. Although illustration has been omitted, coating made of a substance which is relatively non-magnetic or weak magnetic and non-conductive or low conductive (e.g. chrome plating) as the above described filling material 61 should preferably be applied on the conductive substance portions 65b of the rod section 65 so as to smoothen the outer periphery of the rod section 65.

In the detection devices using the plate-like rod section 65 as shown in FIGS. 39 through 41, the modifications of the pattern of the conductive substance portion on the plate-like rod section and the modifications of the coil section as shown in FIGS. 16 through 23 are applicable.

Figure 42:
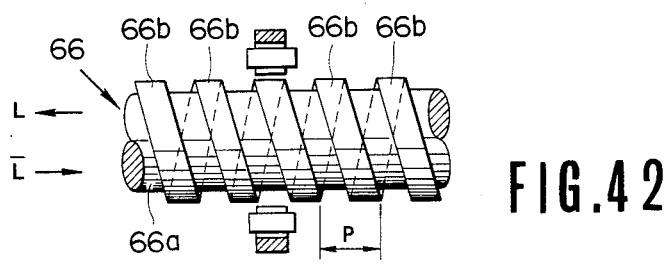
FIG. 42 is a partly sectional side elevation showing still another embodiment of the invention.
Figure 43:
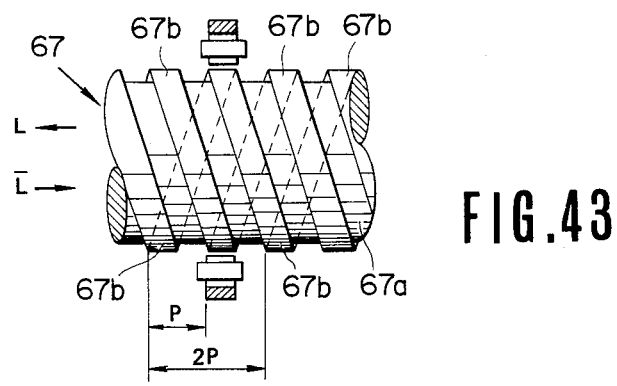
FIG. 43 is a partly sectional side elevation showing still another embodiment of the invention.

In the same manner as in the embodiments shown in FIGS. 24-27, the conductive substance portion may be provided in the spiral form as shown in FIGS. 42 and 43. The embodiment of FIG. 42 corresponds to the one shown in FIGS. 24 and 25, its coil section being made of four phases. A rod section 66 consists of a conductive substance portion 66b provided spirally on a central rod 66a. This spiral conductive substance portion 66b is provided in a single thread pattern with a pitch P.

The embodiment of FIG. 43 corresponds to the one shown in FIGS. 26 and 27, its coil section being made of eight phases. A rod section 67 consists of a spiral conductive substance portion 67b made of a double thread pattern with a pitch of 2P and provided about a central rod 67a. In FIGS. 42 and 43, a similar coating as described above should preferably be applied on the outermost peripheral surface of the rod sections 66 and 67 so as to smoothen the surface and protect the conductive substance portion.

The conductive substance portion of the rod section need not necessarily be of a continuous spiral form but will suffice if it has some area in the portions facing the end portions of the cores or has an annular pattern.

In the embodiments of FIGS. 33 through 43, the exciting of the coils by the primary AC signals and the processing of the secondary output signals should preferably be performed by the phase-shift system in the previously described manner using the circuit as shown in FIG. 32. However, as described before, other signal processing system may of course be used.

The rod section as shown in FIGS. 33-43 (i.e., the rod section of a type in which the conductive substance portion is deposited with a predetermined pattern on the surface of the central rod or base portion) is easy to manufacture and can be provided cheaply by mass production. FIG. 44 is a flow chart showing an example of such process for manufacturing the rod section. First, a selected conductive substance is deposited over the entire surface (one side or both sides in the case of the plate-like member) of an elongated base portion (i.e., one corresponding to the central rod 60a or the base portions 65a-67a) by a selected surface processing technique (e.g., electro-plating, flame spraying, pattern baking, coating). Nextly, the conductive substance of an unnecessary portion is removed by etching or other technique to form predetermined patterns of the conductive substance portions 60b, 65b-67b. Then, surface coating is performed as required using material corresponding to the filling material 61 of FIG. 35. Finally, the finished elongated rod section if cut to the required length. A resin coating resistive to the etching agent should preferably be applied over the entire surface of the base portion before depositing the conductive substance. This will help prevent the removal agent from erroding not only the conductive substance but the base portion in the etching process.

FIG. 45 is a flow chart showing another example of the process for manufacturing the rod section. In this example, the conductive substance is deposited over the surface of an elongated base portion with a predetermined pattern from the beginning by a selected surface processing technique (e.g., flame spraying or baking) and subsequently the same process as in FIG. 44 is effected.

This invention is applicable to the absolute type linear position detection device as disclosed in Japanese Preliminary Patent Publication No. 79114/1984. This type of absolute linear position detection device comprises plural linear position detection devices having different length P from each other and detects an absolute linear position exceeding the range of P by computation by utilizing difference between respective linear position detection data. If, for example, two linear position detection devices having different length P (i.e., one is $P_1$ and the other $P_2$), plate-like rod sections 68 and 69 may be constructed of a common base portion 70 as shown in FIG. 46. FIG. 46 shows in a plan view an example in which two linear position detection devices as shown in FIGS. 11-13 or FIGS. 39-41. Reference characters 68b and 69b denote conductive substance portions of respective rod sections 68 and 69 and A-D denote a coil section consisting of cores and primary and secondary coils corresponding to the respective phases A-D. Such forming of a pattern of conductive substance portions for plural detection devices on a common base portion can be achieved very easily by the manufacturing processes as shown in FIGS. 44 and 45. Accordingly, the present invention brings about benefits of ease in manufacture and low cost in the above described type of absolute linear position detection device also.

The primary coils and the secondary coils need not necessarily be provided separately but may be common coils as was disclosed in Japanese Preliminary Utility Model Publication No. 2621/1983 or 39507/1983.

Figure 47:
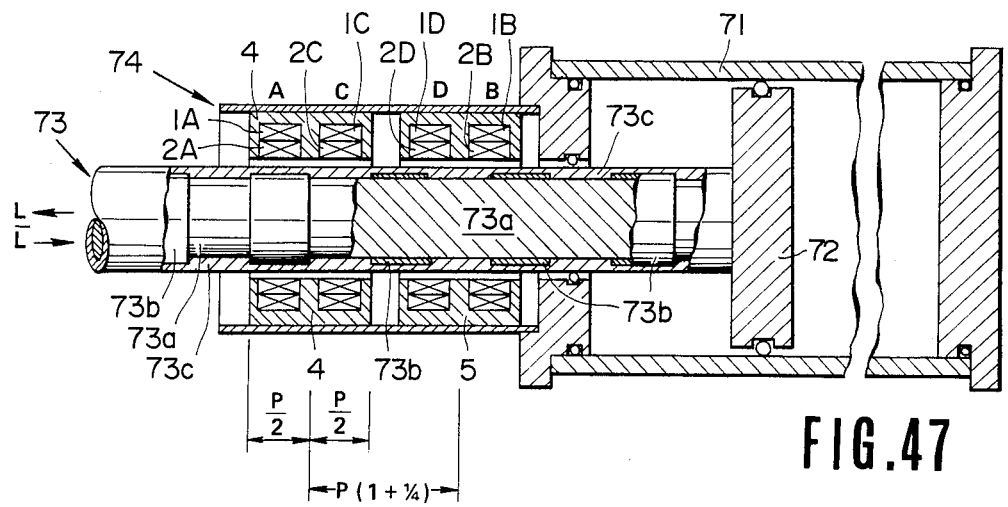
FIG. 47 is a vertical section showing an embodiment of the piston rod position detection device according to the invention.
Figure 48:
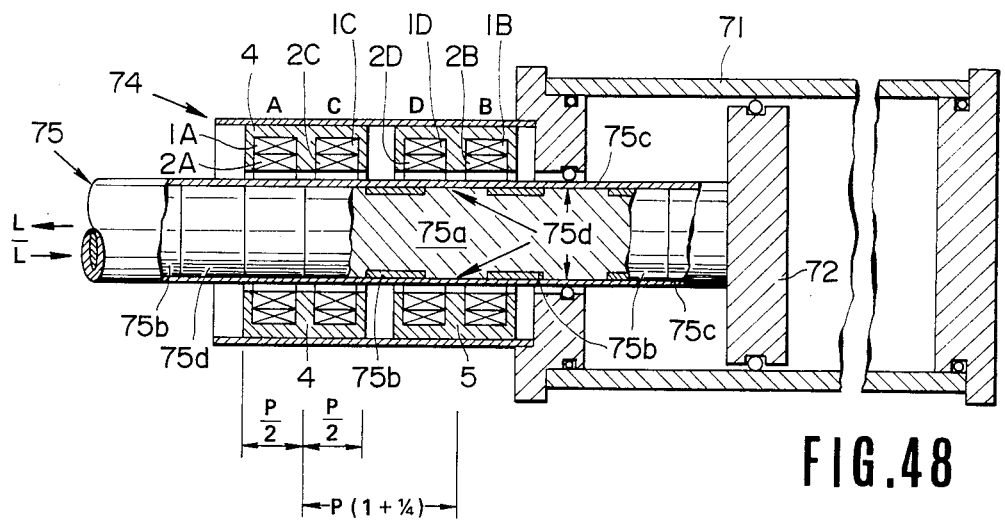
FIG. 48 is a vertical section showing another embodiment of the piston rod position detection device according to the invention.

Referring now to FIGS. 47 and 48, embodiments in which the linear position detection device of the invention has been applied to a piston rod position detection device for a fluid powered cylinder.

FIG. 47 shows an embodiment of a piston rod position detection device utilizing a linear position detection device of a type capable of producing change in the coefficient of induction employing the eddy current loss as a parameter as shown in FIG. 33. Reference character 71 denotes a cylinder main body, 72 a piston, 73 a piston rod. As is well known, an opening is defined in one end of the cylinder main body and the piston rod 73 passes through this opening. A coil section 74 is provided on the side of the opening of this cylinder main body 71. The coil section 74 comprises, as the embodiments shown in FIGS. 2 and 33, primary coils 1A-1D and secondary coils 2A-2D. The coil section 74 is fixedly disposed on the opening side of the cylinder main body 71 in such a manner that the rod 73 is concentrically and slidably disposed in the coil space of these coils 1A-1D and 2A-2D. The piston rod 73 comprises a base portion, i.e., central rod 73a, conductive substance portions 73b provided annularly about the central rod 73a and a coating 73c covering the entire outer peripheral surface. As in FIG. 33, the width of each conductive substance portion 73b is P/2 and a plurality of conductive substance portions 73b are repeatedly provided in the direction of a relative linear displacement of the rod 73. These conductive substance portions 73b are made of a substance which is weak magnetic or non-magnetic and is relatively conductive as compared to the material of the central rod 73a. Suitable material is, e.g., copper, aluminum or brass or a mixture or compound of such good conductive substance and other substance. The central rod 73a may be made either of a magnetic substance or a non-magnetic substance. What is essential is that a substance which has a larger electrical resistance (i.e., less conductive than the conductive substance portions 73b is used for the central rod 73a. This is for enabling more eddy current to flow in the intermittently provided conductive substance portions 73b only thereby to produce a periodic reluctance change with respect to the displacement. If the central rod 73a is made of a magnetic substance such as iron, formation of flux wil be facilitated with resulting increase in the amount of the eddy current whereby the accuracy of detection will be improved.

As the coating 73c provided on the outer periphery of the piston rod 73, a substance which is non-conductive or less conductive than the conductive substance portions 73b and non-magnetic or weak magnetic is used. For example, chrome plating is a suitable coating.

In the above described construction, in the same manner as in the embodiment of FIG. 33, the eddy current flows in the conductive substance portions 73b in response to the degree of entry of these portions 73b into the coils of the respective phases with a result that reluctance change is produced in the magnetic circuits of the respective phases due to the eddy current loss and AC signals of levels corresponding to the reluctances and induced in the secondary coils 2A–2D of the respective phases.

FIG. 48 shows an embodiment of a piston rod position detection device utilizing a linear position detection device of a type capable of producing change in the coefficient of induction in an enhanced manner by employing both the permeance change and the eddy current loss as parameters as shown in FIG. 2. As in FIG. 2, a central portion 75a of a piston rod 75 is made of a magnetic substance. Magnetic substance portions 75d annularly projecting from this central portion 75a are disposed with a predetermined width P/2 in the direction of a linear displacement. Annular recesses formed between the respective magnetic substance portions 75d are filled with annular conductive substance portions 75b. The width of the respective annular conductive substance portions is also P/2. The central portion 75a and the magnetic substance portion 75d are made of iron or other strong magnetic substance whereas the conductive substance portions 75b are made of a substance which is relatively weak magnetic or non-magnetic as compared to the magnetic substance portion 75d and relatively conductive (e.g., copper, aluminum or brass or a mixture of such good conductive substance and other substance). A coating 75c such as chrome plating is provided over the entire outer periphery of the piston rod 75. This coating may 75c may be a sleeve made of a synthetic resin.

In the above described construction, in the same manner as in the embodiment in FIG. 2, the reluctance is increased in an enhanced manner in a place where the magnetic substance portion 75d is absent, i.e., where the conductive substance portions 75b are provided so that decrease in the level of the secondary side induced voltage is enhanced. In both the embodiments of FIGS. 47 and 48, the various modifications (such as modifications in the coil section and the rod section) which were described previously with reference to FIGS. 2 through 46 may be adopted as required. As for the signal processing system for obtaining a piston rod position detection signal, the phase-shift system as shown in FIG. 32 may of course be employed. Alternatively, the previously described analog voltage detection system may be employed. As for the pattern forming method for the conductive substance portions in the piston rod, the above described various methods may be selectively employed.

As described in the foregoing, according to the invention, the range of change of the secondary output voltage level can be broadened due to the enhancing effect by the reluctance change caused by the displacement of the magnetic substance portion and the equivalent reluctance change responsive to the eddy current loss caused by the displacement of the conductive substance portions whereby an accurate detection can be achieved. Particularly, by application of the present invention, a sufficient range of change in the secondary output voltage level can be obtained even in small type detectors in which such range of change has not been obtained in the past due to the limitation posed thereon by their mechanical construction. Thus, small type detectors with a high accuracy of detection can be provided.

Further, according to the invention, a linear position detection over a long range can be achieved by providing a plurality of conductive substance portions repeatedly at a predetermined interval in the rod section. The function of the reluctance change with respect to the linear displacement can be made cyclic so that an accurate position detection by the phase-shift system is achieved. According to the invention, the conductive substance portions are deposited on the base portion of the rod section with a predetermined pattern by employing a selected surface processing technique so that the process for manufacturing the rod section can be simplified and the manufacturing cost reduced.

Further, according to the invention, the conductive substance may be deposited on the peripheral surface of the piston rod with a predetermined pattern so that processing and forming are facilitated. Since the conductive substance portion can fully perform its function even if it is thin, the construction is simplified as compared to a case where a groove is merely formed in the magnetic substance portion (in this case, the groove must be cut sufficiently deep). Furthermore, the range of change in the secondary output voltage level with respect to the displacement can be broadened by the combination of the projections on the magnetic substance portion and the conductive substance portions so that the accuracy of detection can be improved.

What is claimed is:

1. A linear position detection device including a coil section and a rod section being disposed in such a manner that it is capable of relative linear displacement with respect to said coil section, said coil section having at least two primary coils and secondary coil means corresponding to said primary coils, respective primary coils being excited by primary AC signals which are out of phase with one another so as to obtain, on the secondary coil means side, an output signal which is produced by phase-shifting one of said primary AC signals in accordance with the relative linear position of said rod section wherein the rod section is generally of a bar configuration and said rod section comprises:

a magnetic substance portion changing the reluctance of a magnetic circuit passing through said coil section in accordance with said relative linear displacement; and a conductive substance portion provided in part of the rod section where the reluctance is caused to increase relatively in such a manner that an eddy current path will be formed relative to flux and made of substance which is relatively weak magnetic or non-magnetic and relatively conductive as compared with said magnetic substance portion, a plurality of said magnetic substance portions and said conductive substance portions being provided alternately, wherein the amount of the phase shift of the primary AC signals corresponds to 360 degrees electrical angle with respect to an amount of displacement corresponding to one cycle of the alternation of said magnetic and conductive substance portions in said rod section.

2. A linear position detection device as defined in claim 1 wherein said rod section is generally of a round bar configuration.

3. A linear position detection device as defined in claim 1 wherein said rod section is generally of an elongated plate-like configuration.

4. A linear position detection device as defined in claim 1 wherein said coil section includes a magnetic substance core wound with one or more coils and end portions of said core are opposed to a peripheral surface of said rod section with a gap therebetween.

5. A linear position detection device as defined in claim 1 wherein said magnetic substance portions and said conductive substance portions are provided annularly.

6. A linear position detection device as defined in claim 1 wherein said magnetic substance portions and said conductive subtance portions are provided spirally.

7. A linear position detection device as defined in claim 1 wherein said magnetic substance portion is formed as a projection in a magnetic substance member constituting a base of said rod section and said conductive substance portion is provided in a recessed portion of said magnetic substance member.

8. A linear position detection device as defined in claim 7 wherein said conductive substance portion is formed by depositing by surface treatment substance which is relatively weak magnetic or non-magnetic and relatively conductive as compared with said magnetic substance portion in said recessed portion of said magnetic substance member.

9. A linear position detection device as defined in claim 1 wherein said rod section comprises a tube made of non-magnetic substance and a plurality of said magnetic substance portions and said conductive substance portions provided alternately and annularly in said tube.

10. A linear position detection device as defined in claim 1 which further comprises:
   AC signal generation means for generating the respective primary AC signals; and
   phase difference detection means for detecting phase difference between one of the primary AC signals and the output signal of the secondary coil means to obtain detected phase difference data as linear position data of said rod section.

11. A linear position detection device as defined in claim 1 wherein predetermined non-magnetic and non-conductive substance is applied over the entire periphery of said rod section having said magnetic substance portion and conductive substance portion on the peripheral surface thereof.

12. A linear position detection device as defined in claim 1 wherein said device is a position detection device for detecting a position of a piston rod of a fluid powered cylinder and wherein
   said coil section is provided on the open end side of a cylinder main body of said cylinder, and
   said rod section having said magnetic substance portion and conductive substance portion is formed on a peripheral surface of said piston rod.

13. A linear position detection device including a coil section and a rod section being disposed in such a manner that it is capable of relative linear displacement with respect to said coil section, said coil section having at least two primary coils and secondary coil means corresponding to said primary coils, respective primary coils being excited by primary AC signals which are out of phase with one another so as to obtain, on the secondary coil means, an output signal which is produced by phase-shifting one of said primary AC signals in accordance with the relative linear position of said rod section, wherein said rod section is generally of a bar configuration and said rod section comprises:
   a plurality of conductive substance portions provided repeatedly at a predetermined interval in the direction of said relative linear displacement, said respective conductive substance portions being provided in such a manner that an eddy current path relative to flux produced by said coil section will be formed and being made of substance which is weak magnetic or non-magnetic and relatively conductive as compared with substance of the remaining portion of said rod section,
   and wherein the amount of the phase-shift corresponds to 360 degrees electrical angle with respect to an amount of displacement corresponding to one cycle of sequence of said conductive substance portions in said rod section, and a base portion of said rod section is coated with resin over the entire periphery thereof and a predetermined conductive substance is deposited on said coated resin over the entire periphery of said rod and said conductive substance is removed thereafter in a predetermined pattern thereby to leave conductive substance of a predetermined pattern which constitutes said conductive substance portions.

14. A linear position detection device as defined in claim 13 wherein said conductive substance portions consist of annular members provided at a predetermined interval about said rod section.

15. A linear position detection device as defined in claim 13 wherein said rod section is generally of an elongated plate-like configuration.

16. A linear position detection device as defined in claim 13 wherein said coil section includes a magnetic substance core wound with one or more coils and end portions of said core are opposed to a peripheral surface of said rod section with a gap therebetween.

17. A linear position detection device as defined in claim 13 wherein said conductive substance portions are spirally provided about a cylindrical center rod.

18. A linear position detection device as defined in claim 13 wherein said conductive substance portions are made by depositing conductive substance in a predetermined pattern on a base portion of said rod section.

19. A linear position detection device as defined in claim 18 wherein said conductive substance is deposited by electroplating.

20. A linear position detection device as defined in claim 18 wherein said conductive substance is deposited by flame spraying.

21. A linear position detection device as defined in claim 18 wherein said conductive substance is deposited by pattern baking.

22. A linear position detection device as defined in claim 13 wherein predetermined non-magnetic and non-conductive substance is applied over the entire periphery of said rod section having said conductive substance portions on the peripheral surface thereof.

23. A linear position detection device as defined in claim 13 wherein said device is a position detection device for detecting a position of a piston rod of a fluid powered cylinder and wherein said coil section is provided on the open end side of a cylinder main body of said cylinder, and said rod section having said conductive substance portions is formed on a peripheral surface of said piston rod.

24. A linear position detection apparatus comprising a plurality of linear position detection devices each having a coil section and a rod section being disposed in such a manner that it is capable of relative linear displacement with respect to said coil section, said coil section having at least two primary coils and secondary coil means corresponding to said primary coils, respective primary coils being excited by primary AC signals which are out of phase with one another so as to obtain, on the secondary coil means side, an output signal which is produced by phase-shifting one of said primary AC signals in accordance with the relative linear position of said rod section, said rod section of said respective detection devices comprising a plurality of conductive substance portions provided at a predetermined interval in the direction of said relative linear displacement, said respective conductive substance portions being provided in such a manner that an eddy current path relative to flux produced by said coil section will be formed and being made of substance which is weak magnetic or non-magnetic and relatively conductive as compared with substance of other portion of said rod section, and said rod section of said respective detection devices being made of a common base portion and sequence of said conductive substance portions corresponding to each of said rod section being provided independently on said common base portion and an interval of repetition of said conductive substance portions being different between the respective rod sections.

25. A linear position detection device including a coil section and a rod section being disposed in such a manner that it is capable of relative linear displacement with respect to said coil section, said coil section having at least two primary coils and secondary coil means corresponding to said primary coils, respective primary coils being excited by primary AC signals which are out of phase with one another so as to obtain, on the secondary coil means side, the output signal which is produced by phase-shifting one of said primary AC signals in accordance with the relative linear position of said rod section wherein said rod section is generally of an elongated plate-like configuration and said rod section comprises:

a magnetic substance portion provided in predetermined part of the rod section thereby changing the reluctance of a magnetic circuit passing through said coil section in accordance with said relative linear displacement; and a conductive substance portion provided in part of the rod section where the reluctance is caused to increase relatively in such a manner that an eddy current path will be formed relative to flux and made of substance which is relatively weak magnetic or non-magnetic and relatively conductive as compared with said magnetic substance, a plurality of said magnetic substance portions and said conductive substance portions being provided alternately, such that the amount of the phase-shift corresponds to 360 degrees electrical angle with respect to an amount of displacement corresponding to one cycle of the alternation of said magnetic and conductive substance portions in said rod section.

26. A linear position detection device including a coil section and a rod section being disposed in such a manner that it is capable of relative linear displacement with respect to said coil section, said coil section having at least two primary coils and secondary coil means corresponding to said primary coils, respective primary coils being excited by primary AC signals which are out of phase with one another so as to obtain, on the secondary coil means side, the output signal which is produced by phase-shifting one of said primary AC signals in accordance with the relative linear position of said rod section, said rod section being generally of an elongated plate-like configuration and said rod section comprising:

a plurality of conductive substance portions provided repeatedly at a predetermined interval in the direction of said relative linear displacement, said respective conductive substance portions being provided in such a manner that an eddy current path relative to flux produced by said coil section will be formed and being made of substance which is weak magnetic or non-magnetic and relatively conductive as compared with substance of other portion of said rod section, such that the amount of the phase-shift corresponds to 360 degrees electrical angle with respect to an amount of displacement corresponding to one cycle of sequence of said conductive substance portions in said rod section, and a base portion of said rod section is coated with resin over the entire periphery thereof and a predetermined conductive substance is deposited on said coated resin over the entire periphery of said rod and said conductive substance is removed thereafter in a predetermined pattern thereby to leave conductive substance of a predetermined pattern which constitutes said conductive substance portions.

* * * * *